United States Patent [19]

Treffner et al.

[11] 4,399,948

[45] Aug. 23, 1983

[54] PULVERIZER

[76] Inventors: Peter Treffner; Charles Treffner, both of 43 Yangoora Rd., Belmore, N.S.W. 2192, Australia

[21] Appl. No.: 189,566

[22] Filed: Sep. 23, 1980

[30] Foreign Application Priority Data

Oct. 9, 1979 [AU] Australia ............................. PE0842

[51] Int. Cl.$^3$ ...................... B02C 13/06; B02C 13/22
[52] U.S. Cl. ........................... 241/152 A; 241/188 A; 241/259.1
[58] Field of Search ........... 241/57, 60, 152 R, 152 A, 241/188 R, 188 A, 190, 192, 236, 243, 158, 159, 241–259.1

[56] References Cited

U.S. PATENT DOCUMENTS

| | | | |
|---|---|---|---|
| 1,811,438 | 6/1931 | Riley et al. | 241/188 A X |
| 2,338,373 | 1/1944 | Aurig | 241/188 A X |
| 2,893,649 | 7/1959 | Mischawski | 241/108 X |
| 3,067,958 | 12/1962 | Garwin | 241/55 |
| 3,490,706 | 1/1970 | Rogers et al. | 241/190 X |
| 3,584,799 | 6/1971 | Feder | 241/44 |
| 3,815,835 | 6/1974 | Apostol et al. | 241/188 A |
| 3,897,012 | 7/1975 | Malan | 241/188 A X |

FOREIGN PATENT DOCUMENTS

| | | |
|---|---|---|
| 522710 | 4/1931 | Fed. Rep. of Germany . |
| 2385511 | 3/1978 | France . |
| 455666 | 11/1936 | United Kingdom . |
| 834007 | 5/1960 | United Kingdom ........... 241/188 A |

Primary Examiner—Eugene F. Desmond
Attorney, Agent, or Firm—Stevens, Davis, Miller & Mosher

[57] ABSTRACT

Plastics foam scrap is drawn by an air stream through a three-stage disintegrating apparatus. Each stage includes a plurality of moving interdigitating pins and the pin spacing and a passage dimension of each stage decreases from stage to stage thereby reducing the material to its component beads.

22 Claims, 2 Drawing Figures

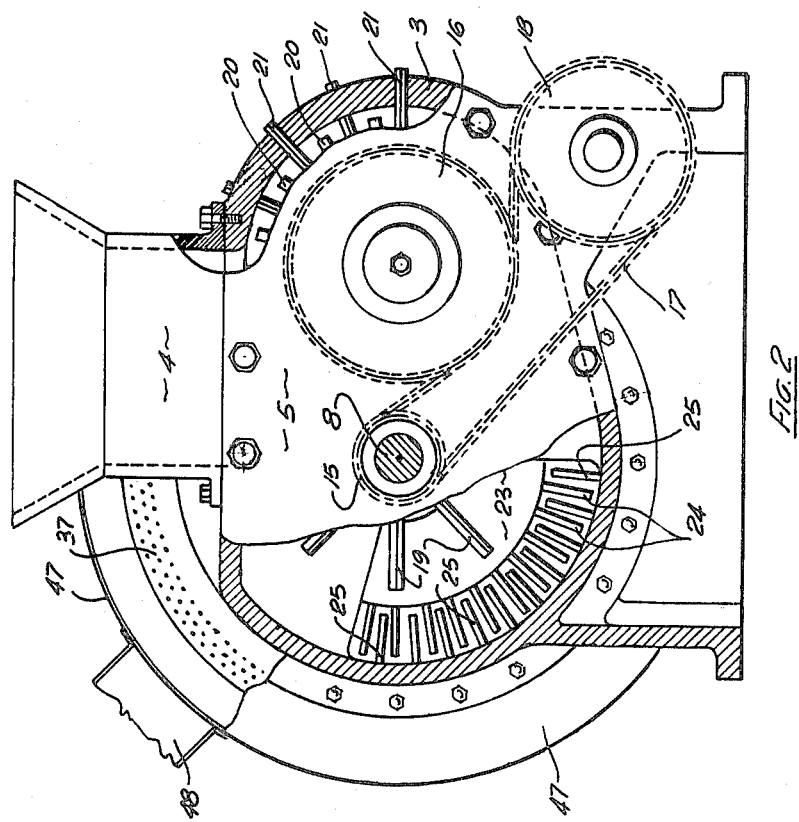

PULVERIZER

FIELD OF THE INVENTION

This invention relates to the reclamation of scrap plastics foam material, in particular expanded polystyrene foam and similar rigid foams.

BACKGROUND OF THE INVENTION

Articles made from expanded polystyrene and similar foams are produced from a starting material in the form of small pellets which are placed in a mould and heated whereupon gas is liberated within each pellet and it expands into a foam bead which adheres to its adjacent beads. The quantity of pellets inserted into the mould is calculated so that once each has expanded into a bead the resulting mass of beads adhered together fills the mould.

It sometimes happens, of course, that a faulty article is produced or for other reasons scrap material is produced and for economy it is desirable to reprocess such scrap material.

Conventionally, the reprocessing is achieved by fragmenting the scrap into particles and including a minor proportion of those particles within a mould with pellets for incorporation in a further article.

Hitherto the apparatus for reclaiming scrap foam has comprised conventional type pulverisers or mills utilizing rapidly rotating hammers or blades to fragment the scrap by impact or utilizing cooperating toothed milling plates which disintegrate the scrap by a shearing action between pairs of closely spaced teeth.

Typical of prior art devices are those described in specification of U.S. Pat. No. 3,815,835 Australian Pat. No. 19579/34 and Australian Pat. No. 164,887.

Such prior known devices are noisy, use large amounts of power and usually have small intake apertures reducing their effective throughputs for low density but bulky scrap such as plastics foam.

Furthermore due to the fragmenting or grinding action much of the foamed material is crushed with consequent release of gases from within its cells. The reclamation action is usually not completed in a single pass through the device and some material may remain therein for a period before being reduced to the required size. This further damages the particles and also creates a considerable amount of dust.

As a result the granulate produced by previously known apparatus is not homogeneous, the particles are irregular in shape and thus neither flow freely nor mix readily with freshly formed beads in a subsequent moulding process.

Therefore freshly moulded material incorporating prior known reclaimed foam granulate is frequently uneven in composition and dust accumulations are visible in it. The crushed particles tend to shrink into solid lumps in the foam mass and if, for example, the article being produced is a block of foam intended subsequently to be cut to shape the wire cutting elements commonly used for that purpose on striking such hard lumps deflect and leave flaws in the cut surface.

SUMMARY OF THE INVENTION

The present invention was devised to overcome the above indicated disadvantages, or least to ameliorate them, by reducing scrap foam to a quantity of discrete particles corresponding to the original beads of which it was composed. That is to say the apparatus of the invention disintegrates the foam mass into its component beads without disintegating the beads themselves to an appreciable extent.

The invention achieves that object by passing the scrap material through a passageway wherein it is raked or combed continuously by interdigitating pins of which the spacing between pins reduces as the material moves along the passageway. The reduction in spacing is not necessarily uniform but may occur in stages, but, in general, the pin spacing at one point in the passageway will be less than it is at a corresponding upstream point in the passageway.

The interdigitating pins are moved relatively slowly (by comparison with the tips of previously used hammer mill blades), and the spacing between them is relatively large by comparison with those of prior known toothed milling devices even at the outlet end of the passageway.

Thus, in apparatus according to the invention the foam is squeezed and gently ruptured into smaller pieces as it moved along the passageway with the rupturing occurring at the inter-faces between or contacting surfaces of the original beads which are weaker in shear than is the inner material of the beads.

Therefore the invention consists in apparatus for disintegrating scrap plastics foam material into its composite beads, comprising at least two opposed surfaces defining a passage between them, a plurality of breaker pins projecting from each surface with the pins of one surface interdigitating with those of the other, means to move at least one surface to cause relative movement of its breaker pins relative to those of the other, and means to cause scrap material to move through said passage; the interpin spacing decreasing at least in stages along the passage in the direction of movement of the material.

In preferred embodiments the width of the passage reduces in the direction of travel of material and at the exit end approximates in width a little more than the diameter of the beads in the material being processed so that individual beads may escape but two beads still adhered together are prevented from readily escaping.

For preference the outlet aperture is adjustable in size to suit varying input materials.

BRIEF DESCRIPTION OF THE DRAWINGS

FIG. 2 is a sectional view taken on line 2—2 of FIG. 1 but with some parts cut-away to show details remote from that line.

DESCRIPTION OF THE PREFERRED EMBODIMENT

Figure 1:
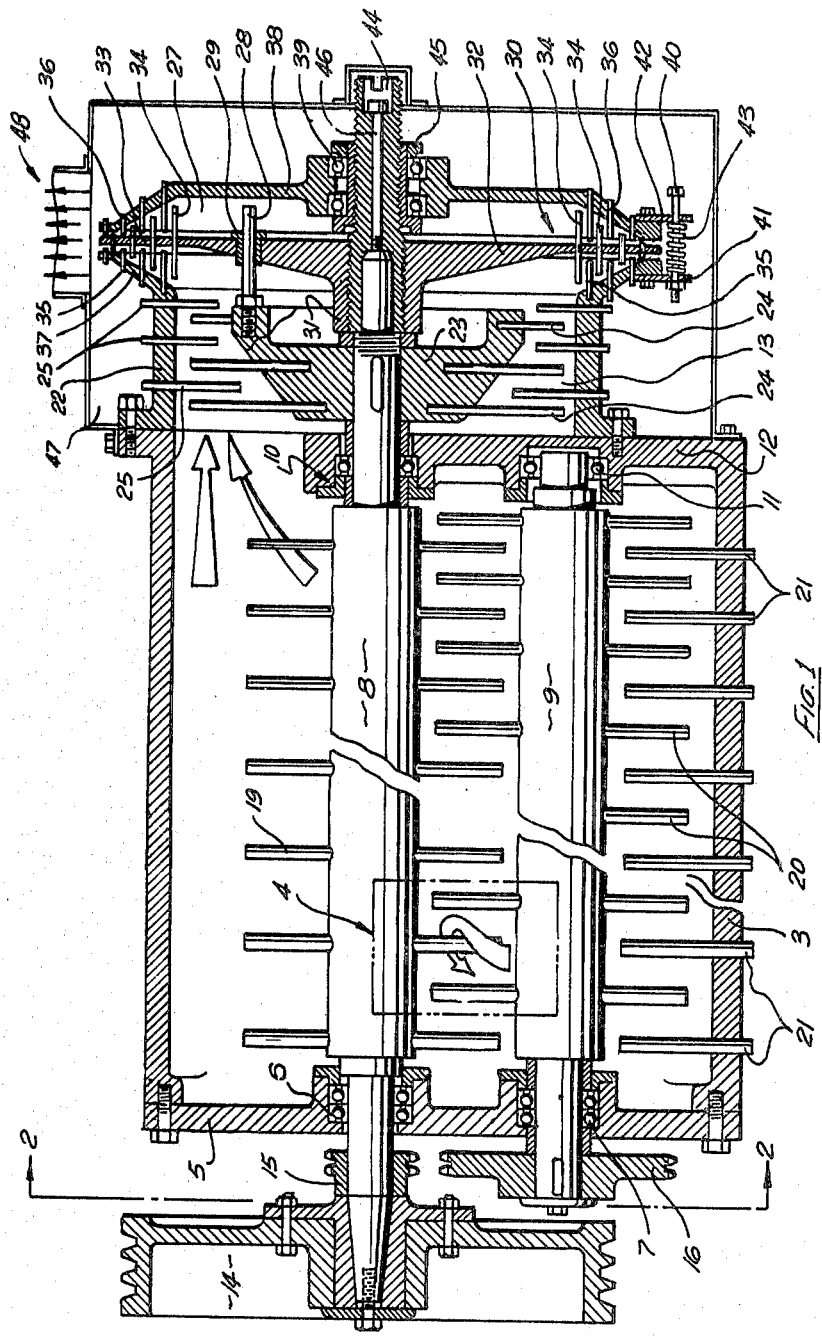
FIG. 1 is a sectional plan view of an apparatus according to the invention.

The illustrated embodiment of the invention comprises a pre-breaker barrel 3 furnished with an inlet hopper 4 (shown in phantom in FIG. 1) near one end by which scrap foam material may be fed into the barrel 3.

An end wall 5 of the barrel 3 houses bearings 6 and 7 for the rotational support of a main shaft 8 and a lay shaft 9 respectively. The shafts 8 and 9 are also supported by bearings 10 and 11 housed in an opposite part end wall 12 having openings in it communicating with a pre-granulator chamber 13.

A grooved pulley 14 is affixed to one end of the main shaft 8 for V-belt drive connection to an electric motor having a similarly grooved but smaller output pulley (not shown). The main shaft 8 also has a chain sprocket 15 secured to it and the lay shaft 9 has a similar, though larger diameter, sprocket 16 secured to it. A conventional drive transmission chain 17 extends about the sprocket 15 and an idler sprocket 18 and bears against an arc of the sprocket 16.

Thus, rotation of the pulley 14 by the motor not only causes rotation of main shaft 8 but also rotation of the lay shaft 9. The two shafts rotate in opposite directions and the main shaft 8 rotates at approximately three times the speed of the lay shaft 9 because of the differing diameter of the sprockets 15 and 16.

The lay shaft 8 has a plurality of breaker pins 19 extending radially from it and it will be noted that the pins 19 near the input end of the barrel are somewhat more widely spaced apart than those near the output end of the barrel. The lay shaft 9 has a corresponding plurality of radially extending breaker pins 20 which interdigitate with pins 19.

For preference, several rows of stationary breaker pins 21 project radially inwardly of the barrel wall and also interdigitate with the pins 20.

Thus relatively large pieces of scrap foam material fed through the hopper 4 are squeezed between the pins 19 and 20 on the one hand or the pins 20 and 21 on the other hand to be broken into smaller chunks for exit as indicated by the arrows in FIG. 1 into the pre-granulator chamber 13.

In experiments leading to the present embodiment of the invention it was found that the differing speeds of rotation of the shafts 8 and 9 is important as otherwise there is a tendency for the pins 19 and 20 to cut grooves through the infed large pieces of foam and to leave them more or less stationary sitting on the shafts 8 and 9 whereas it has been found that with the shafts turning at different speeds the pieces of foam are caused to jostle or move about in a way which overcomes that tendency.

The pre-granulator chamber 13 is defined by a cylindrical pre-granulator stator 22 and conical pre-granulator rotor 23. The rotor 23 is keyed to the main shaft 8 and rotates therewith.

The rotor 23 has three rings of breaker pins 24 projecting from it interdigitating with stationary breaker pins 25 projecting radially inwardly of the stator 22. It will be noticed that the spacing between the rings of pins 24 and 25 is less than the spacing between the pins 20 or 19 even at the outlet end of the pre-breaker barrel 2.

It will also be seen that because of the conical shape of the rotor 23 the passage available for the flow of material through the pre-granulator chamber progressively reduces in cross-sectional area.

The pins 24 and 25 operating in the same manner as pins 19 and 20 still further reduce the size of the foam material so that it emerges from the pre-granulator chamber into a granulator chamber 26 as smaller chunks suitable for final reduction to its composite beads.

A driving pin 28 extends from the pre-granulator rotor 23 through a bush 29 set in one spoke of a granulator rotor 30. The granulator rotor 30 comprises a hub 31 a plurality of spokes 32 and an annular planar rim 33 having three circles of relatively closely spaced granulator breaker pins 34 extending through it so as to project axially of the chamber on each side of it. The pins 34 interdigitate with two sets of stationary breaker pins 35 and 36 respectively.

Pins 35 are fixed into an outwardly flared frusto-conical flange 37 integral with the pre-granulator stator 22 whereas the pins 36 similarly project from a disc like granulator stator 38.

The granulator stator 38 is supported by bearings 39 and is held stationary by means, for example of a plurality of equally spaced apart anchorage bolts 40 extending through brackets 41 and 42 secured to the peripheries of flange 37 and the granulator stator 38 respectively. Loading springs 43 are sleeved upon the bolts 40 to maintain the stator 38 and the flange 37 at the maximum spacing permitted by adjustment means to be described below.

Thus it will be seen from the foregoing that as the main shaft 8 and the pre-granulator rotor 23 rotate then so does the granulator rotor 30 whereas the granulator stator 38 remains fixed relative to the stator 22. Therefore once again the relative movement between the interdigitating pins 35 and 36 and also 34 and 36 effect a further disintegration of the feed material. The particle size of the exiting material is controlled by the spacing between the tips of the radially outer most circles of pins 36 and 35 and the rim of the granulater rotor 33.

So that that spacing may be adjusted to suit the bead size of the material being treated adjustment means are provided. Those means comprise an externally threaded carrier piece 44, an internally threaded saddle 45 upon which the bearings 39 are sleeved and the internally threaded hub 31 of the rotor 30. During normal operation the carrier piece 44 is caused to turn as one with the shaft 8 by means of a clamping screw 46 which loads the carrier endwisely into frictional restraining engagement with a shoulder on the shaft 8.

When adjustment is required the screw 46 may be slackened off and the carrier 44 rotated relative to the shaft 8 thereby causing the rotor 30 and the saddle 45 to move axially along the carrier piece 44. The pitch of the thread on the carrier piece 44 engaging the saddle 45 is twice that of the thread engaging the hub 31 so that during any such adjustment the stator 38 moves twice the distance of the rotor 30 so that the latter remains centrally positioned between the outermost row of pins 36 and 35 respectively.

The pre-granulator and granulator stages of the apparatus are encased in a substantially air-tight sheet metal enclosure 47 which is connected by way of an outlet duct 48 to a high capacity low pressure blower which operates to draw a stream of air in through the chute 4 then through the apparatus as a whole to effect the transport of the foam pieces through the various stages. The resultant pellets may be extracts from the airstream by any conventional sieving or like arrangements.

We claim:

1. Apparatus for disintegrating scrap plastics foam material into its composite beads comprising:
   a double sided granulator rotor having a plurality of breaker pins projecting from each side thereof;
   a housing around said rotor having two sets of stationary pins projecting therefrom, one set interdigitating with the pins on one side of the rotor and the other set interdigitating with the pins on the other side thereof;
   said housing having an exit for the scrap plastics pieces along at least part of the periphery of the housing, radially outward from the axis of rotation;
   at least one of the inner walls of the housing being at an angle to the rotational plane of the rotor so as to present an exit path of decreasing cross-sectional area in the direction of the exit, the rotor extending radially outwardly into the peripheral exit, dividing it into two portions and the housing comprising two axially spaced apart portions with means to move said portions toward and away from each other so as to vary the width of said peripheral exit.

2. The apparatus of claim 1 in which the pins extend substantially parallel to the axis of rotation of the rotor.

3. The apparatus of claim 1 in which the pins are positioned closer together at the exit than radially inward thereof.

4. The apparatus of claim 1 in which the rotor comprises a central hub, a plurality of spokes extending radially outwardly therefrom and an annular rim fixed to the spokes with said rotor pins being arranged in at least one circle on said rim and projecting axially outward on each side.

5. The apparatus of claim 1 in which the means to move said portions is a threaded shaft at the center of one portion extending from said rotor.

6. The apparatus of claim 5 in which said shaft is threaded into the housing portion with a thread of a first pitch and is threaded into said rotor with a thread of a second pitch which is twice that of said first pitch so that upon adjustment of the exit width the rotor will remain centrally positioned in relation to the exit path.

7. The apparatus of claim 6, including a locking screw extending axially through the center of said threaded shaft and threaded into the end of the rotor drive shaft.

8. Apparatus for disintegrating scrap plastics foam material into its composite beads comprising:
an elongated housing having a pair of parallel shafts mounted for rotation therein and means for driving the shafts in opposite directions of rotation;
a plurality of pins projecting radially outwardly from each shaft and interdigitating with each other; a plurality of pins projecting from at least one interior wall of said housing and interdigitating with the pins of at least one of said shafts;
a granulator axially spaced from said pair of shafts and comprising
a two sided rotor mounted for rotation with a housing, said rotor having a plurality of breaker pins extending from each side and adjacent the outer periphery thereof in a direction generally parallel to the axis of rotation of said rotor;
said housing having two sets of stationary pins projecting therefrom, one set interdigitating with the pins on one side of the rotor and the other set interdigitating with the pins on the other side thereof.

9. The apparatus of claim 8 in which the granulator rotor comprises a central hub, a plurality of spokes extending radially outwardly therefrom and an annular rim fixed to the spokes with said rotor pins being arranged in at least one circle on said rim and projecting axially outward on each side.

10. The apparatus of claim 8 having means to drive one of said shafts at a rotational speed at least twice that of the other shaft.

11. The apparatus of claim 10 in which the pins are spaced closer together near the exit of the shaft housing.

12. The apparatus of claim 10 having a pre-granulator at the exit of the shaft housing, said pre-granulator having a rotor with a plurality of breaker pins extending outwardly therefrom, a fixed housing around said rotor having a plurality of stationary pins extending inwardly therefrom and interdigitating with said rotor pins; said pre-granulator feeding said granulator.

13. The apparatus of claim 12 in which the pre-granulator rotor is of conical shape so that the passage available for the flow of material through the pre-granulator is of progressively smaller cross-sectional area.

14. The apparatus of claim 12 in which the pre-granulator is driven from an extension of one of said shafts.

15. The apparatus of claim 14 in which said granulator rotor is driven from an extension of the shaft driving the pre-granulator.

16. The apparatus of claim 8 in which the granulator housing has an exit for the scrap plastics pieces along at least part of the periphery of the housing, radially outward from the rotor.

17. The apparatus of claim 16 in which at least one of the inner walls of the housing is at an angle to the rotational plane of the rotor so as to present an exit path of decreasing cross-sectional area in the direction of the exit.

18. The apparatus of claim 17 in which the pins of the rotor are positioned closer together at the exit than radially inward thereof.

19. The apparatus of claim 16 in which the rotor housing is comprised of two axially spaced apart portions with means to move said portions toward and away from each other so as to vary the width of said peripheral exit.

20. The apparatus of claim 19 in which the means to move said portions is a threaded shaft at the center of one portion extending from said rotor.

21. The apparatus of claim 20 in which said shaft is threaded into the housing portion with a thread of a first pitch and is threaded into said rotor with a thread of a second pitch which is twice that of said first pitch so that upon adjustment of the exit width the rotor will remain centrally positioned in relation to the exit path.

22. The apparatus of claim 21, including a locking screw extending axially through the center of said threaded shaft and threaded into the end of the rotor drive shaft.

* * * * *